(12) United States Patent
Anderson

(10) Patent No.: US 6,302,491 B1
(45) Date of Patent: Oct. 16, 2001

(54) CONTROL SYSTEM FOR CONTROLLING THE POSITION OF A DUMP TRUCK TAILGATE

(76) Inventor: Gene D. Anderson, 796 E. Birch St., Barron, WI (US) 54812

(*) Notice: Subject to any disclaimer, the term of this patent is extended or adjusted under 35 U.S.C. 154(b) by 0 days.

(21) Appl. No.: 09/556,812

(22) Filed: Apr. 25, 2000

(51) Int. Cl.⁷ ..................................................... B60P 1/26
(52) U.S. Cl. ............... 298/23.5; 298/23 M; 298/23 MD
(58) Field of Search ..................... 298/23 MD, 23 M, 298/23.5, 22 R; 292/267, 274, 298

(56) References Cited

U.S. PATENT DOCUMENTS

| | | | |
|---|---|---|---|
| 3,404,918 | * 10/1968 | Lackey | 298/23 M |
| 5,092,656 | * 3/1992 | Eldridge | 298/23 S |
| 5,890,770 | * 4/1999 | Palmberg, Jr. | 298/23 MD |
| 6,135,565 | * 10/2000 | Bachelor | 298/23 M |

* cited by examiner

*Primary Examiner*—Stephen T. Gordon
(74) *Attorney, Agent, or Firm*—Herman H. Bains

(57) ABSTRACT

A control system for controlling the opening and closing of the tailgate of a dump truck includes an actuator unit which is mounted on the truck box or tailgate. The actuator unit controls the degree of opening of the tailgate during the unloading operation and therefore the rate at which the material is discharged from the truck box. A positional feedback unit produces an output signal indicating the movement of the tailgate between open and closed positions. This signal is displayed on a control panel of a control unit in the truck cab. An operator in the truck cab can therefore control opening and closing of the tailgate and can monitor the position of the tailgate. The control system effects an accurate metering of material from the truck box.

13 Claims, 3 Drawing Sheets

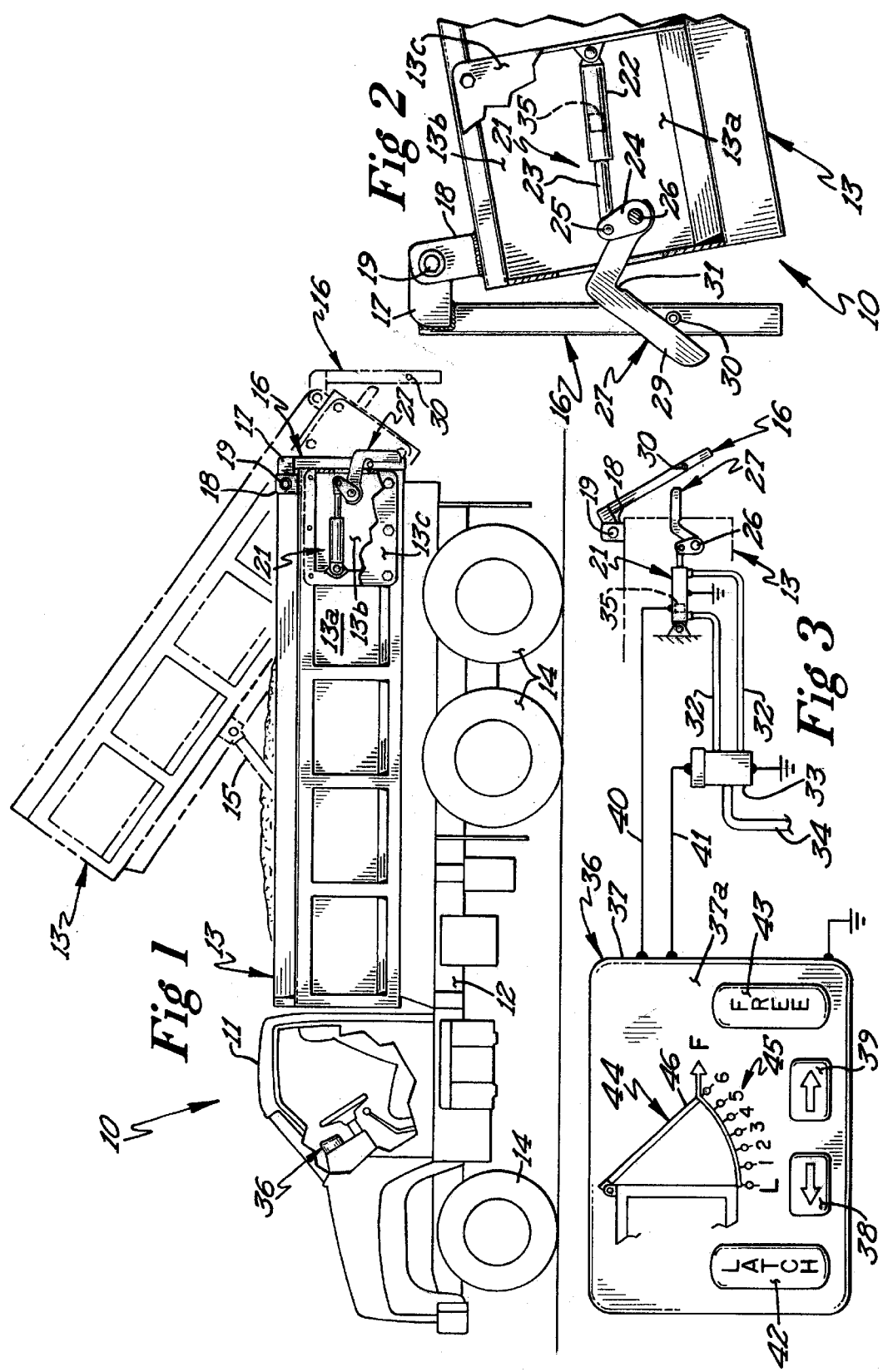

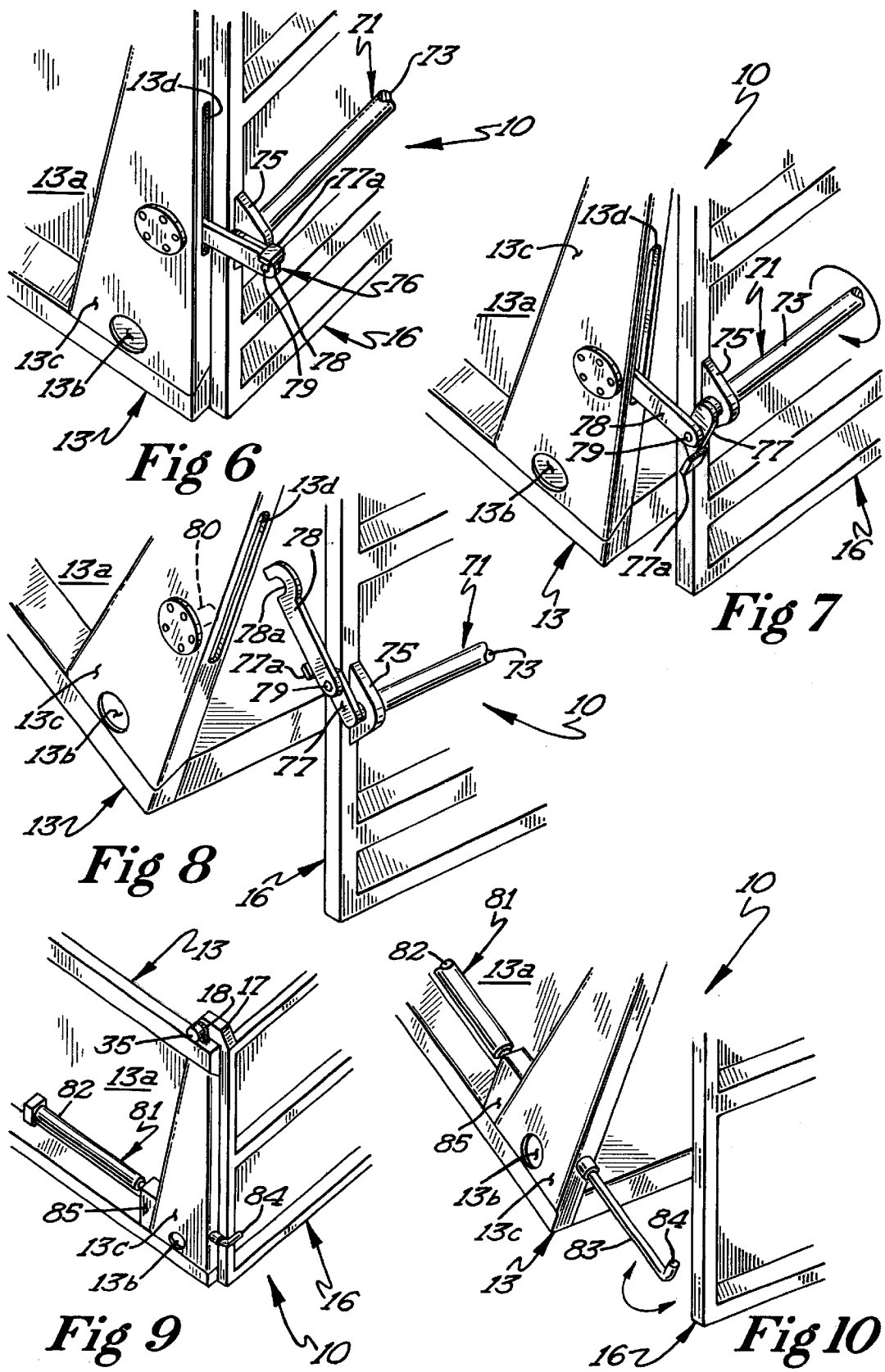

CONTROL SYSTEM FOR CONTROLLING THE POSITION OF A DUMP TRUCK TAILGATE

FIELD OF THE INVENTION

This invention relates to a control system for controlling the position of the tailgate of a dump truck as material is dumped from the truck.

BACKGROUND OF THE INVENTION

In conventional dump truck design, a truck operator usually upon reaching the dump site is first required to adjust the tailgate chains which limits the amount the tailgate opens during the dumping operation. The operator then returns to the cab and via the console unlatches the tailgate, elevates the truck box and begins the application of material from the truck box.

However, if the adjustment of the tailgate chains was incorrect, if the chains had become entangled, or if something in the material was restricting discharge of the material from the truck box, the operator would then be required to leave the cab to readjust or disentangle the chains, or clear the restriction impeding the flow of material from the truck box. Since the truck box is elevated, the material load within the truck box is now applying pressure to the tailgate chains, and it becomes almost impossible to adjust the chains without shifting the material within the truck box (lowering the truck box) away from the tailgate.

In the event the operator attempts to adjusts the chains without shifting the load (lowering the box), severe injury to the operator may result due to the forces involved. In order to readjust the chains, the operator must be standing at the rear end of the truck. When an operator attempts to readjusts the chains, the operator's focus is changed from operating an entire material handling system (dump truck) to making a point of application adjustment (adjusting the tailgate). When the operator is required to leave the cab, the operator is much more vulnerable to ground traffic. Further, when making such a readjustment of the tailgate chains, the operator may also give up a strategic vantage point thereby losing sight of the overall conditions developing around the operating environment.

The amount of man and equipment hours lost in adjusting the tailgates of conventional dump trucks is a major consideration. The hours lost in adjusting and readjusting the tailgate in these conventional dump trucks are impossible to recover.

SUMMARY OF THE INVENTION

An object of this invention is to provide a novel control system for variably controlling and continuously monitoring the position of the tailgate of a conventional dump truck as material is discharged from the truck. The novel control system allows the material discharged from the truck box or body to be variably adjusted by an operator in the cab and thereby allows accurate metering of the material from the truck.

The amount of travel or degree of opening of the tailgate is controlled by an actuator unit which may be mounted on the tailgate, dump box or tailgate hinge shaft. Operation of the actuator unit is accomplished via a control unit in the truck cab. The output signals produced by a positional feedback unit located on or adjacent the tailgate are received by the control unit allow the operator to not only precisely control the position of the tailgate but to also continuously monitor the position of tailgate as it shifts between closed and open positions. This arrangement provides the operator with real time information with respect to the position of the tailgate from a location (truck cab) remote from the tailgate.

Further, this control system enhances operator safety and substantially reduces the time lost during adjustments required in the conventional dump truck operation.

BRIEF DESCRIPTION OF THE FIGURES OF THE DRAWINGS

FIG. 1 is a side elevational view of a conventional dump truck incorporating the novel control system with certain parts thereof broken away for clarity;

FIG. 2 is a fragmentary view of portion of the dump truck box illustrating one embodiment of the actuator unit;

FIG. 3 is a schematic view of one embodiment of the control system;

FIG. 6 is a fragmentary perspective view similar to FIG. 4 but illustrating another embodiment of the actuator unit with the tailgate in the closed position;

FIG. 7 is a fragmentary perspective view of the embodiment of FIG. 6 illustrating the tailgate in the partially opened position;

FIG. 8 is a fragmentary perspective view of the embodiment of FIG. 6 but illustrating the actuator unit disengaged from latching pin on the truck box;

FIG. 9 is a fragmentary perspective view similar to FIG. 4 and illustrating a further embodiment of the actuator unit with the tailgate in the closed latched position; and FIG. 10 is a fragmentary perspective view of the embodiment of FIG. 9 and illustrating the tailgate disengaged from the actuator unit.

DESCRIPTION OF THE PREFERRED EMBODIMENT

Figure 4:
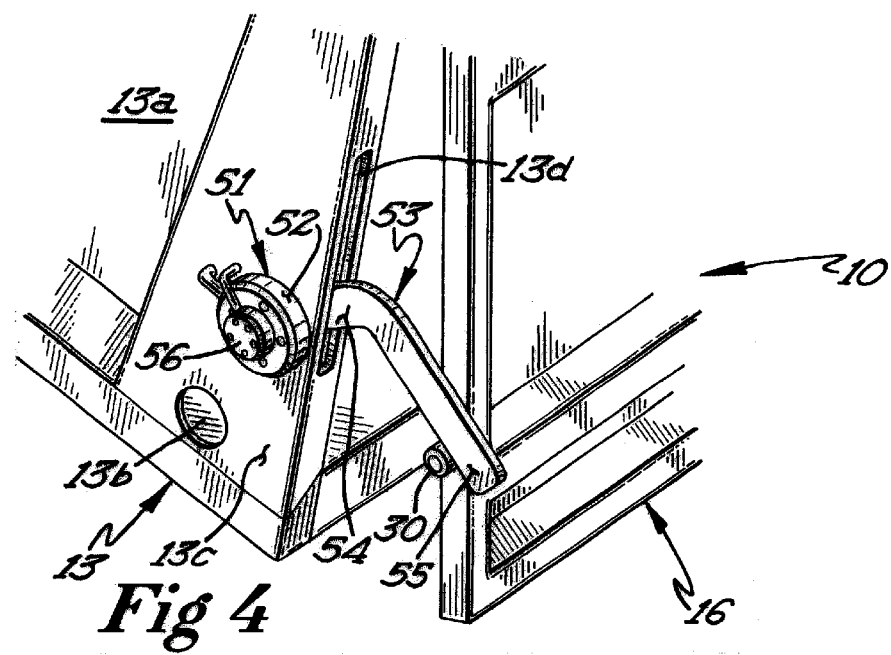
FIG. 4 is a fragmentary perspective view of a portion of the truck box and tailgate illustrating another embodiment of the actuator unit.

Referring now to the drawings, and more particularly to FIG. 1, it will be seen that a conventional dump truck, designated generally by the reference numeral 10, and incorporating the novel control system is thereshown. The dump truck 10 includes a cab 11 mounted on a chassis 12 which also pivotally mounts a conventional open top, generally rectangular or parallelepiped shaped truck body or box 13. Although the pivot mount for the truck box 13 is not shown, the pivot mount is of conventional construction and is positioned in the usual location rearwardly of the rear dual wheels. The truck box is adapted to contain material which is to be unloaded through the rear end at a selected application site.

During conventional operation of a dump truck, such as that shown in FIG. 1, the truck box 13 will contain the material to be unloaded. The operator will drive to the application site and adjust the chains to limit the amount the tailgate may open. It will be appreciated that the tailgate swings open by action of gravity as the truck box is elevated. Note the phantom line configuration of FIG. 1.

The driver will then unlatch the gate via a console in the cab and then move the truck slowly forward as material is discharged from the truck box 13. The rate at which the material is discharged from the truck box is determined by the opening defined between the tailgate and truck box 13. If the rate of discharge is incorrect, the driver must leave the cab to readjust the setting of the chains. Thus, the operator is exposed to the dangers of ground traffic, and possible injury if readjustment is attempted when the truck box 13 is elevated. These kinds of stoppages are also time consuming.

The present control system overcomes these problems and affords a substantial savings in man hours. The control system, schematically shown in FIG. 3, includes an actuator unit 21.

In the embodiment of FIGS. 1–3, the actuator unit 21 includes a pair of identical actuators each mounted on one side wall 13a of the truck box 13. A compartment 13b containing each actuator is located at the rear end portion of a side wall 13a and is closed by a suitable cover plate 13c.

Each actuator includes a hydraulic cylinder 22 having a piston therein connected to a piston rod 23 having an outer end positioned between and pivotally connected by a pivot 25 to a pair of arms 24 The arms 24 are pivotally connected to a sidewall 13a of the truck box 13 by a pivot 26. The arms 24 are fixedly connected to one end of an arm of a L-shaped latching member 27. The other arm 29 of the L-shaped latching member 27 extends angularly from the arm 28. The L-shaped latching member 27 has a locking notch 31 on the inner surface thereof located at the juncture of the arms 28 and 29. Each latching member 27 engages one of a pair of pins 30 secured to the lower side edge portion of the tailgate 16.

It will be seen that when the piston rods 23 are extended, each L-shaped latching member will be moved to the position illustrated in FIG. 1, and pins 30 on the tailgate will be positioned in the locking notches 31. The tailgate 16 will then be locked in a closed position. When the piston rod is shifted in a retracting direction, the L-shaped latching members 27 will be pivoted from the latching position of FIG. 1 in a direction to allow progressive opening of the tailgate 16 if the truck box is elevated. Complete retraction of the piston rods allow the pins 30 on the tailgate to move free of the respective latching members 27.

The control system 20 is also provided with a positional feedback unit 35 which, in the embodiment shown, is a linear potentiometer. The linear potentiometer positional feedback unit 35 is a commercial unit of well-known construction and a detailed showing is not required. The linear potentiometer is positioned within the cylinder 22 and senses the position of the piston/rod 23 and ultimately the position of the tailgate 16 during movement of the tailgate. In the embodiment shown, the linear potentiometer is a Model No. 6300 Series Internal Position Sensor manufactured by Duncan Electronics, a Division of BEI Electronics Co.

The hydraulic cylinder and piston actuator unit 21 may be a commercial model including the WT Series manufactured by Bailey Hydraulics, Inc. The linear potentiometer may be incorporated in the hydraulic unit when purchased. It is pointed out that other commercial linear potentiometers may be used instead of Model 6300 manufactured by Duncan Electronics.

The feedback unit 35 may also be an inductive or capacitive proximity sensor and target arranged in a linear or radial pattern depending on the design of the actuator unit. Suitable inductive or capacitive proximity sensors are those manufactured by Turck Products. Acceptable inductive or capacitive proximity sensors and target sensors are also manufactured and sold by Baumer Electric of Germany. Optical encoders may also be used as the feedback unit.

The control system 20 also includes a control unit or console 36 which is mounted in the cab 11 of the truck for easy access by a truck operator. The control unit 36 includes a housing 37 which contains the electric components and which presents a control panel 37a. The control panel 37a has a pair of normally open switches 38 and 39.

The switches are electrically connected to a solenoid valve 33 by electrical conductors 41. A pair of conduits intercommunicate the solenoid valve 33 with the hydraulic cylinder 22. It will be appreciated that there is a hydraulic system for each hydraulic cylinder. The solenoid valve 33 is also connected in communicating relation by a supply conduct 34 to the conventional hydraulic fluid supply of the truck. It will be seen that when switch 38 is closed, hydraulic fluid which be directed by the solenoid valve 33 into the cylinder 22 to cause the piston rod 23 to be extended thereby moving the tailgate 16 in a closing or latching direction. Conversely, when switch 39 is closed, the solenoid valve 33 will direct fluid to the cylinder 22 to cause retraction of the piston rod and movement of the tailgate in an opening direction.

The control panel 37a is also provided with directional indicators 42 and 43 which indicate the direction the tailgate will move if switch 38 or switch 39 is closed. The control panel 37a further includes a tailgate position indicator 44 which includes a plurality of LEDs (light emitting diodes) 45 arranged in an arcuate pattern and provided with a number sequence, each number located adjacent an LED. A stationary representation 46 of the tailgate in a partially open position is also provided. The letter designation L indicates the locked position and letter designation F indicates unlatched or free. Electrical conductors 40 electrically connect the positional feedback unit to the electrical components of the tailgate position indicator 44.

During operation of control system illustrated in FIG. 1–3, the operator, upon reaching an application site, will close switch 39 until the tailgate position indicator 44 indicates the desired open position of the tailgate. The truck box 13 will then be raised and the material will be applied in the conventional manner as the truck is moved forwardly. Ready adjustment of the position of the tailgate 16, for any reason, can be accomplished by merely actuating the switches 38 or 39. The operator may therefore continuously monitor and control the position of the tailgate from the safety of the cab. The novel control system allows controlled, metered application of the material to be discharged from the truck box 13.

Referring now to FIG. 4, a different embodiment of the actuator unit 51 is thereshown. The actuator unit 51 includes a reversible rotary hydraulic motor 52 whose output shaft (not shown) is fixedly connected to an angular shaped latching member 53. The latching member 53 includes an arm 54 which is fixed to the output shaft of the rotary hydraulic motor. An arm 55 is integral with arm 54 and engages and retains the locking pin 30 of the tailgate 16 when the tailgate is in a closed position or in a partially open position for discharge of material from the truck box.

A positional feedback unit 56 is mounted on the hydraulic motor 52 and comprises a rotary potentiometer similar to that of FIG. 1–3. The positional feedback unit 56 continuously senses the angular position of the latching member, and, hence the position of the tailgate 16. Output signals from the positional feedback unit 56 are transmitted to the control unit 36.

The output shaft of the rotary hydraulic motor 52 are positioned in a compartment in the sidewall 13a of the truck box and the arm 54 projects outwardly of a rear opening 13*d* in the compartment. It will be seen that rotation of the output shaft of the hydraulic motor in one direction will move the latching member in a latching direction and movement in the opposite direction will move the latching member 53 in an unlatching or free direction.

Figure 5:
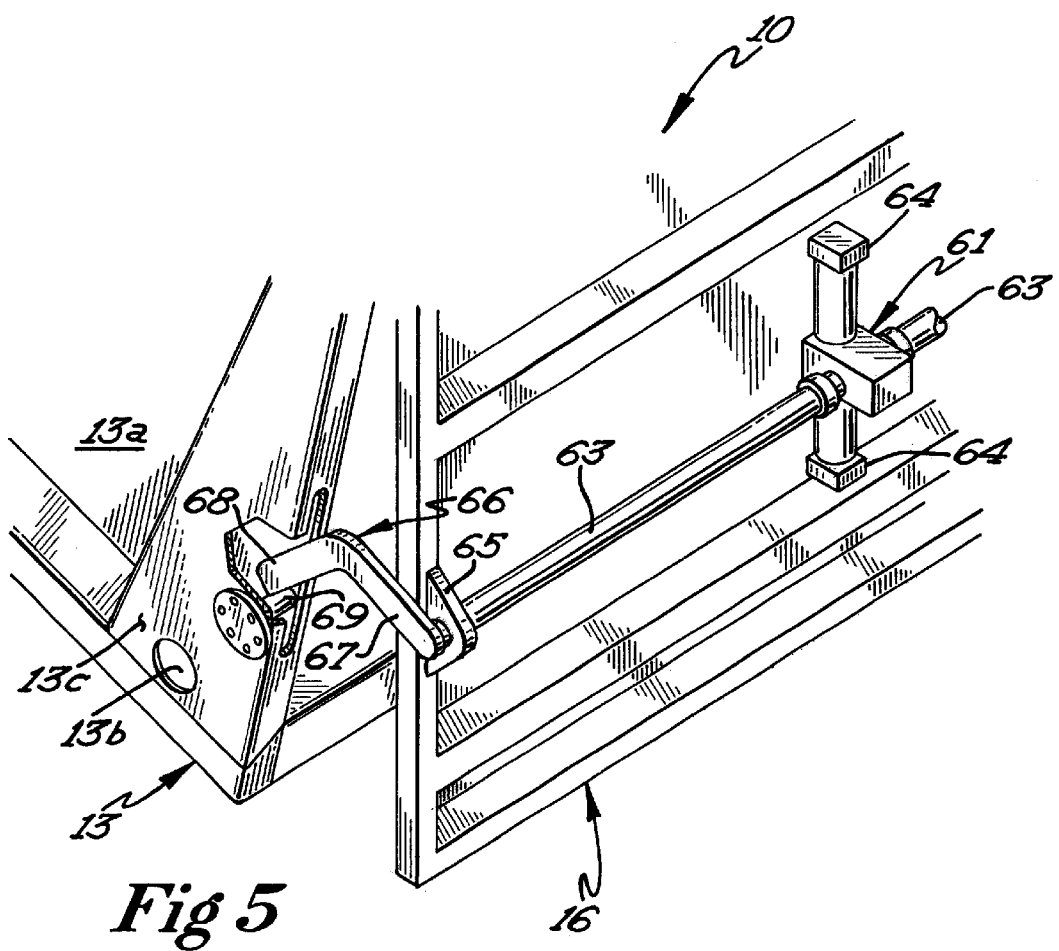
FIG. 5 is a fragmentary perspective view similar to FIG. 4 and illustrating a further embodiment of the actuator unit.

Referring now to FIG. 5, another embodiment of the actuator system is thereshown and includes a pair of hydraulic rams including a pair of cylinders 64 mounted on the rear surface of the tailgate. The cylinders are connected to a source of hydraulic fluid under pressure and are provided with pistons and piston rods. The piston rods are provided with teeth to define a rack, each rack engaging a pinion gear within a housing. The pinion gears drive a shaft 63, the outer ends of which are journaled in suitable bearing 65.

Angular latching members 66 are affixed to the ends of the shaft 63 for movement therewith. Each angular latching member 66 includes an arm 67 fixedly connected to an end of the shaft 63 and an arm 68 which is engagable with a locking pin 69 positioned within a compartment 13*b* and closed by a cover plate 13*c*. The locking pins 69 are therefore mounted on the truck box 13 and the latching member 66 is mounted on the tailgate. The pins 69 are located within the compartments 13*b* which are provided with rearwardly facing openings 13*d*. It will be seen that when the cylinder and piston units are actuated the shaft will be selectively rotated in one direction or the other. Rotation of the shaft 63 opens and closes the tailgate 16.

Although not shown in the drawings, a positional feedback unit is provided and is positioned within the hydraulic motor housing. The positional feedback unit is a commercially available rotary potentiometer which sends output signals to the control unit 36. The position of the tailgate can be controlled and monitored at all times by an operator.

Referring now to FIGS. 6, 7 and 8, it will be seen that another embodiment of the actuator unit 71 is thereshown. The actuator unit 71 will include a hydraulic actuator system like that of embodiment of FIG. 5 mounted on the rear surface of a tailgate 16 and having an output shaft 73 projecting from opposite sides thereof. The ends of the shaft 73 are journaled in suitable bearings 75 mounted on the rear surface of the tailgate 16.

Sectional latching members 76 are secured to the outer ends of the output shaft 73 and are moveable therewith. Each latching member 76 includes an arm 77 affixed to the outer end of the output shaft 73. The arm 77 is pivoted to an elongate arm 78 by a pivot 79. The outer end of the arm 78 is provided with a latching recess 78*a* and the outer end portion of arm 77 is provided with a stop element 77*a* projecting outwardly from one longitudinal edge thereof.

The truck box 13 is provided with locking pins 80 located within a compartments closed by cover plates 13*c*. It will be noted that when output shaft 73 is rotated in one angular direction, the sectional latching member will be moved in direction to close the tailgate 16, and when moved in the opposite direction, the tailgate will be moved in an opening direction. When the tailgate 16 is moved from a closed or latched position (FIG. 6), in an opening direction, the sectional latching members 76 will be extended from a folded position to an unfolded position.

In FIG. 6, the sectional latching members will be in a folded side-by-side relation similar to a toggle linkage. The arms 77 and 78 will progressively unfold in an opening direction until the arm 78 engages a stop element 77*a* on arm 77. Relative movement between the arms ceases when this occurs. In the completely unlatched position, the tailgate will swing free (FIG. 8). As the arms unfold, the arm 78 will disengage from the pin 80. Conversely, when the arms 77, 78 move to the folded position (FIG. 6), the arms will move relative to each other until the latching recess 78*a* engages pin 80.

The positional feed back unit (not shown) will be a commercial rotary potentiometer like that of FIG. 5 and positioned with a housing.

Referring now to FIGS. 9 and 10, it will be seen that a further embodiment of the actuator unit 81 is thereshown. The actuator unit includes a double acting hydraulic cylinder 82 having a piston rod 83 extending therefrom. The outer end of the piston rod 83 is bent to define a latching element 84. The piston rod 83 extends through a housing 85 which has a cylindrical opening therein through which the piston rod extends. The cylindrical opening or bore in the housing 85 is provided with a spiral groove (not shown) therein for receiving a pin on the piston rod. The interaction of the pin and spiral groove cause the piston to rotate during linear movement thereof.

It will be seen that when the piston is retracted (FIG. 9), the latching element 84*s* will engage the tailgate and hold the tailgate in a closed and latched position. When the piston rod 83 is extended, the tailgate will be allowed to progressively move in an opening direction. The piston rod 83 will simultaneously rotate about its longitudinal axis during this linear movement until the latching element 84 disengages from the tailgate 16 allowing the tailgate to swing free (FIG. 10).

Although not shown in the drawings, the actuator unit will be provided with a positional feedback unit. In the embodiment of FIGS. 9 and 10, the positional feedback unit comprises a commercially available linear potentiometer positioned within the cylinder 82 and electrically connected to the control unit. In all of the embodiments, control of the position of the tailgate is controlled by an operator in the cab while continuously monitoring the disposition of the tailgate.

From the foregoing description, it will be seen that a number of embodiments of the control system have been illustrated and described. It is pointed out that the actuator unit of the control system can be mounted on the tailgate, dump box or hinge (shaft mount) of the tailgate. In the embodiments shown, the actuator units have been shown as mounted on the dump box or tailgate.

Although the actuator units have been illustrated as hydraulically actuated, other power systems may also be used. Electric and pneumatic power system or a combination of electric, pneumatic and hydraulic power systems may be used. The control system may be sold as a kit for retrofitting dump trucks or it may be sold as OEM equipment on newly produced trucks. Although the control system is preferably to be used with dump trucks, the control system may also be used with trailers or similar vehicles in which the material is pushed from a tailgate opening while the vehicle remains horizontal. Although the control unit of the present embodiments has been illustrated as visually perceptible to an operator, an audible system may also be used. A combination of visual and audible control system may be employed. Finally, it will be seen that the present control system provides the operator constant real time information about the position of the tailgate thereby allowing the operator to adjust the tailgate for optimum application of the material being unloaded.

What is claimed is:

1. A control system for variably controlling and accurately metering the material discharged from a conventional dump truck, the dump truck including a cab, a chassis, a conventional rectangular shaped truck box structure, and a rectangular tailgate structure, the truck box structure being pivotally mounted on the chassis for pivoting movement between lowered transport and elevated unloading positions, the tailgate structure being pivotally connected at its upper edge portion to the rear upper end portion of the truck box structure for swinging movement between closed and open positions, said control system comprising an actuator unit, means for mounting the actuator unit on one of the truck box and tailgate structures, means operatively connected to the actuator unit for engaging the other of the truck box and tailgate structures and cooperating with said actuator unit to selectively control the position of the tailgate structure as the tailgate structure moves between closed and open positions, a positional feedback unit, means for mounting the feedback unit on one of the truck box and tailgate structures, said feedback unit being operable for continuously sensing the position of the tailgate structure as it moves between closed and open positions and producing output signals in response to the sensed movement of the tailgate structure, a control unit adapted to be mounted in the cab of the dump truck and being operable to selectively control the actuator unit to thereby control the position of the tailgate structure during the unloading operation, the control unit receiving output signals from the positional feedback unit and converting such signals to positional information of the tailgate structure perceptible to an operator in the cab whereby the position of the tailgate structure may be continuously monitored by the operator and material within the dump truck box structure may be accurately metered as the material is unloaded from the truck.

2. The control system as defined in claim 1 wherein said actuator unit is adapted to be mounted on the truck box structure, said engaging means comprising a latching member, means for mounting the latching member on the truck box structure, the latching member operatively connected to the actuator unit and adapted to engage the tailgate structure, said latching member being shiftable in one direction for engaging and moving the tailgate structure in a closing direction, and being shiftable in another direction to permit movement of the tailgate structure in an opening direction.

3. The control system as defined in claim 2 wherein said actuator unit comprises a hydraulic cylinder and piston actuator.

4. The control system as defined in claim 2 wherein said actuator unit comprises a rotary hydraulic motor.

5. The control system as defined in claim 2 wherein said latching member is of angular configuration.

6. The control system as defined in claim 1 wherein said control unit includes a visual tailgate structure position means for continuously providing an operator with visually perceptible information which corresponds to the position of the tailgate structure.

7. The control system as defined in claim 1 wherein said actuator unit is adapted to be mounted on the tailgate structure, a latching member, means for mounting the latching member on the tailgate structure, the latching member being operatively connected to the actuator unit and adapted to engage a locking pin on the truck box structure, said latching member being shiftable in one direction for causing movement of the tailgate structure in a closing direction to a closed position with the truck box structure, and being moveable in another direction for permitting movement of the tailgate structure in an opening direction.

8. In combination with a dump truck having a cab, a chassis, a conventional rectangular shaped truck box structure being pivotally mounted on the chassis for pivoting movement between lowered transport and elevating unloading positions, a rectangular shaped tailgate structure pivotally mounted at its upper edge portion to the rear upper end portion of the truck box structure for swinging movement of the tailgate structure between closed and open positions, a control system for variably controlling and monitoring the position of the tailgate structure during unloading of material within the truck box, said control system comprising an actuator unit, means mounting said actuator unit on one of said truck box and tailgate structures, means operatively connected to the actuator unit for engaging the other of said truck box and tailgate structures and cooperating with said actuator unit to selectively control the position of the tailgate structure as the tailgate structure moves between closed and open positions, a positional feedback unit mounted on one of said truck box or tailgate structures, said positional feedback unit being operable for continuously sensing the position of the tailgate structure as it moves signals in response to the sensed movement of the tailgate structure, a control unit mounted in the cab and being operable to control the actuator unit to thereby control the position of the tailgate structure during the unloading operation, the control unit receiving output signals from the positional feedback unit and converting such signals to positional information of the tailgate structure whereby the position of the tailgate structure may be continuously monitored by the operator and material within the truck box structure may be accurately metered as the material is unloaded from the truck.

9. The control system as defined in claim 8 wherein the actuator unit is mounted on the truck box structure, said engaging means comprising a latching member, a locking pin on the tailgate structure, said latching member being moved into and out of engaging relation with the locking pin, said latching member being shiftable in one direction for engaging and moving the tailgate structure in a closing direction, and being shiftable in another direction to permit movement of the tailgate structure in an opening direction.

10. The control system as defined in claim 9 wherein said actuator unit comprises a cylinder and piston actuator.

11. The control system as defined in claim 9 wherein said actuator unit comprises a rotary hydraulic motor.

12. The control system as defined in claim 9 wherein said latching member is of angular configuration.

13. The control system as defined in claim 8 wherein said control unit includes visual position means for continuously providing an operator with visually perceptible information which corresponds to the position of the tailgate structure.

* * * * *